US009047010B2

(12) United States Patent
De Angelis et al.

(10) Patent No.: US 9,047,010 B2
(45) Date of Patent: Jun. 2, 2015

(54) SELECTIVE KEY DISTINCTION AT SYSTEM STARTUP

(75) Inventors: Fabio De Angelis, Gandolfo (IT); Nicola Milanese, Rome (IT); Andrea Napoleoni, Arsoli (IT); Sergio Tarchi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 13/172,127

(22) Filed: Jun. 29, 2011

(65) Prior Publication Data

US 2013/0007427 A1 Jan. 3, 2013

(51) Int. Cl.
| | |
|---|---|
| G06F 9/00 | (2006.01) |
| G06F 9/24 | (2006.01) |
| G06F 3/0488 | (2013.01) |
| G06F 3/0489 | (2013.01) |
| G06F 3/01 | (2006.01) |
| G06F 3/02 | (2006.01) |
| G06F 9/44 | (2006.01) |

(52) U.S. Cl.
CPC .......... *G06F 3/04886* (2013.01); *G06F 9/4401* (2013.01); *G06F 9/4411* (2013.01); *G06F 3/04895* (2013.01); *G06F 3/016* (2013.01); *G06F 3/0202* (2013.01)

(58) Field of Classification Search
CPC ........................................................ G06F 9/44
USPC ......................................................... 713/1, 2
See application file for complete search history.

(56) References Cited

U.S. PATENT DOCUMENTS

| | | | |
|---|---|---|---|
| 5,620,267 A | 4/1997 | Klauber | |
| 6,356,965 B1* | 3/2002 | Broyles et al. | 710/104 |
| 6,445,381 B1* | 9/2002 | Chou | 345/168 |
| 6,575,586 B1* | 6/2003 | Tsau | 362/85 |
| 7,154,428 B2 | 12/2006 | De Clercq et al. | |
| 7,161,587 B2 | 1/2007 | Beck et al. | |
| 7,289,768 B2* | 10/2007 | Kim | 455/67.7 |
| 7,619,619 B2* | 11/2009 | Iwaki | 345/204 |
| 2003/0065915 A1* | 4/2003 | Yu et al. | 713/1 |
| 2003/0224843 A1* | 12/2003 | Wang | 463/1 |
| 2004/0135772 A1* | 7/2004 | Kao et al. | 345/168 |
| 2004/0183783 A1* | 9/2004 | Rojas et al. | 345/168 |
| 2004/0225876 A1* | 11/2004 | Lam | 713/2 |

(Continued)

FOREIGN PATENT DOCUMENTS

| | | |
|---|---|---|
| DE | 202005000995 U1 | 6/2005 |
| WO | 2010141202 A1 | 12/2010 |

OTHER PUBLICATIONS http://en.kioskea.net/faq/4178-laptops-access-bios-settings-key, "Laptops-Access BIOS Setting Key", 4 pages, Oct. 10, 2009.*

(Continued)

*Primary Examiner* — Jaweed A Abbaszadeh
*Assistant Examiner* — Phil Nguyen
(74) *Attorney, Agent, or Firm* — Cuenot, Forsythe & Kim, LLC

(57) ABSTRACT

A method of distinguishing at least one key of a key array. The method can include, via a processor, detecting initial startup of a processing system. The method further can include, during the initial startup, distinguishing at least a first key of the key array from other keys of the key array, wherein the first key is selectable to access a system startup menu or system function.

8 Claims, 3 Drawing Sheets

(56) References Cited

U.S. PATENT DOCUMENTS

| | | | |
|---|---|---|---|
| 2004/0236934 A1* | 11/2004 | Zimmer et al. | 713/1 |
| 2005/0035949 A1* | 2/2005 | Beck et al. | 345/168 |
| 2005/0078090 A1 | 4/2005 | Glatzer et al. | |
| 2006/0245808 A1 | 11/2006 | Salman et al. | |
| 2007/0132735 A1 | 6/2007 | Gil-Gomez | |
| 2007/0173240 A1* | 7/2007 | Lim | 455/418 |
| 2008/0238856 A1* | 10/2008 | Bhowmik et al. | 345/102 |
| 2009/0174664 A1* | 7/2009 | Han | 345/168 |
| 2009/0243898 A1 | 10/2009 | Iorfida et al. | |
| 2010/0156327 A1* | 6/2010 | Chang et al. | 315/362 |
| 2010/0302162 A1* | 12/2010 | Jo | 345/168 |
| 2012/0056748 A1* | 3/2012 | Drucker | 340/584 |
| 2012/0081286 A1* | 4/2012 | Kennedy et al. | 345/168 |
| 2012/0086868 A1* | 4/2012 | Takaya | 348/734 |

OTHER PUBLICATIONS

"Computer keyboard with light-controlled operator guidance such that when a key is pressed, possible sequential keys are illuminated to help a user in locating and pressing the correct keys," [online] Thomson Innovation Record View, Thomson Reuters, [retrieved Jan. 27, 2011] retrieved from the Internet: <http://www.thomsoninnovation.com/tip-innovation/translatedRecView.doc>. [See German Ref: DE202005000995U1].

* cited by examiner

SELECTIVE KEY DISTINCTION AT SYSTEM STARTUP

BACKGROUND

The embodiments disclosed within this specification relate to the interoperation of keyboards with processing systems.

Many processing systems, such as computers, are configured to receive user inputs via a keyboard that is communicatively linked to the processing system, for example via a universal serial bus (USB) port or PS/2 port. Alternatively, some processing systems may use a serial port, AT port, ADP port, or another type of communication port.

During system startup, it is common for the system to provide a variety of startup options and system configuration menus. Such functions and menus typically are accessible by selecting certain specific keys. For example, many systems provide user access to a BIOS menu, which may be accessed by a user selection of the "Delete" key, a function key (e.g., "F2"), or a user selection of another defined key or defined combination of keys. Some systems also provide user access to other system menus, such as a RAID controller menu, and/or functions at system startup via a selection of a defined key or defined combination of keys.

BRIEF SUMMARY

One embodiment of the present invention can include a method of distinguishing at least one key of a key array. The method can include, via a processor, detecting initial startup of a processing system. The method further can include, during the initial startup, distinguishing at least a first key of the key array from other keys of the key array, wherein the first key is selectable to access a system startup menu or system function.

Another embodiment of the present invention can include a key array. The key array can include a plurality of keys, a communication port, and a key presentation controller. The key presentation controller can be configured to selectively distinguish at least one of the keys from other keys of the key array in response to at least one key distinction command received from a processing system.

Yet another embodiment of the present invention can include a computer program product including a computer-readable storage medium having computer-usable program code that, when executed, causes a machine to perform the various steps and/or functions described herein.

DETAILED DESCRIPTION

Figure 1:
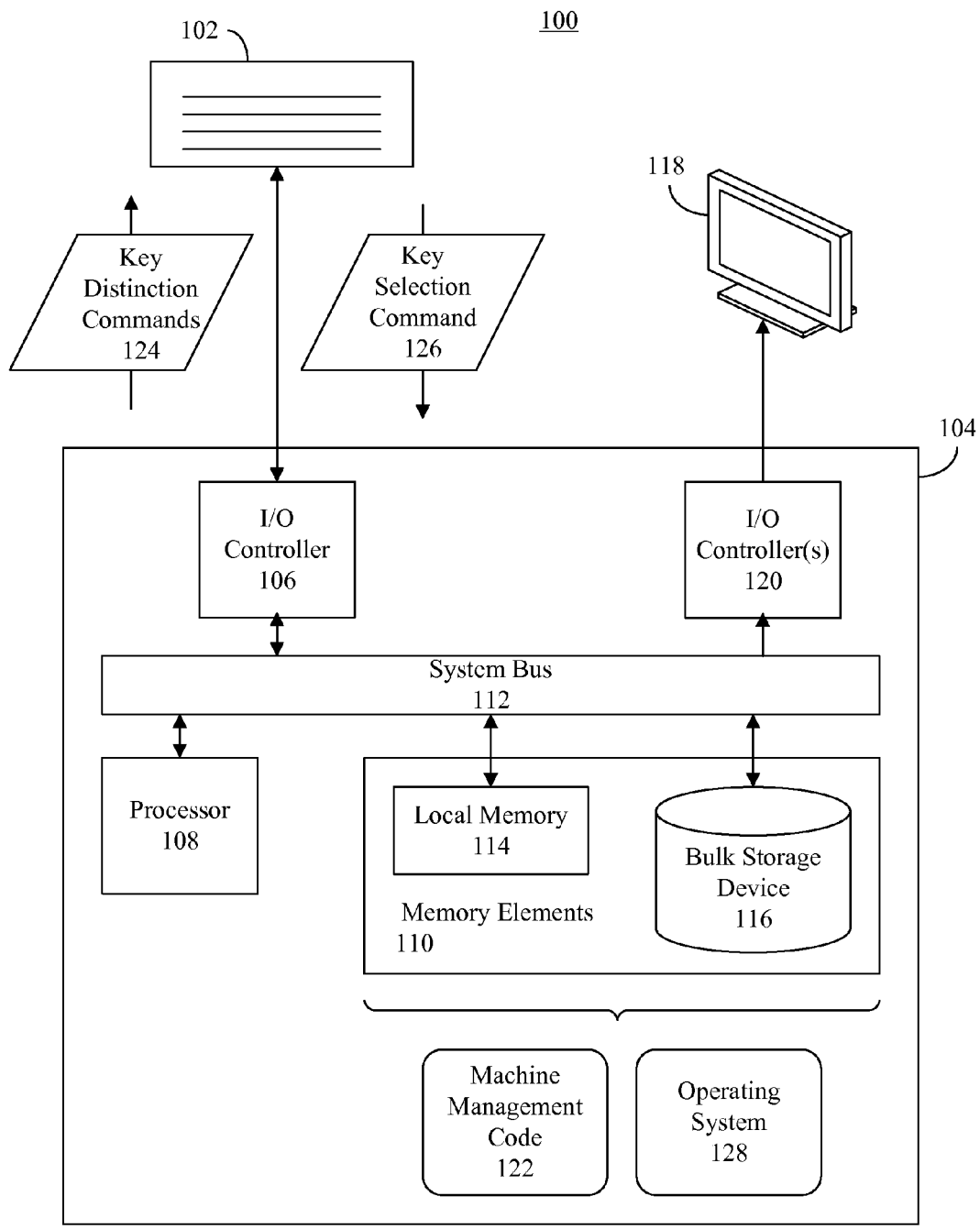
FIG. 1 is a block diagram illustrating a system that provides key distinction in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more machine programming languages, such as assembly languages or similar programming languages.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to selective key distinction at startup of a processing system. Specifically, the present invention relates to visually distinguishing keys which may be selected by a user at system startup to access one or more menus or functions during system startup. Accordingly, the user may be provided an indication of which key or keys can be selected to access menus or functions available at system startup, thereby simplifying the user experience with the system.

FIG. 1 is a block diagram illustrating a system 100 that provides key distinction in accordance with one embodiment of the present invention. In one embodiment, the system 100 can be a computer, such as a server, a workstation, a desktop computer, a laptop computer, a notebook computer, a netbook computer, a tablet computer, or any other type of computer to which an array of keys (hereinafter "key array") 102 may be connected, or in which a key array 102 is integrated. In illustration, the key array 102 can be embodied as a keyboard and/or keypad. In another embodiment, the system 100 can be a personal digital assistant (PDA), a mobile telephone, or the like, which integrates a key array 102, such as a keypad, or to which an external key array 102 (e.g., keyboard or keypad) may be connected.

The system 100 can include a processing system 104 to which the key array 102 is communicatively linked via an input/output (I/O) controller 106. The I/O controller can be, for example, a universal serial buss (USB) controller, a PS/2 controller, a serial I/O (SOI) controller, an AT controller, ADP controller, or the like. Further, the processing system can include a suitable port (not shown) via which the key array 102 connects to the I/O controller 106. Such I/O controllers and ports are well known to those skilled in the art.

The processing system 104 can include at least one processor 108 coupled to memory elements 110 through a system bus 112. As such, the processing system 104 can store program code within memory elements 110. The processor 108 can execute the program code accessed from memory elements 110 via the system bus 112. In one aspect, for example, the processing system 104 can be implemented as computer that is suitable for storing and/or executing program code. It should be appreciated, however, that processing system 104 can be implemented in the form of any system comprising a processor and memory that is capable of performing the functions described within this specification.

The memory elements 110 can include one or more physical memory devices such as, for example, local memory 114 and one or more bulk storage devices 116. Local memory 114 refers to random access memory or other non-persistent memory device(s) generally used during actual execution of the program code. Bulk storage device(s) 116 can be implemented as an erasable programmable read-only memory EPROM), electrically erasable programmable read-only memory (EEPROM), or Flash memory, a hard disk drive (HDD), a solid state drive (SSD), and/or other persistent data storage device. The processing system 104 also can include one or more cache memories (not shown) that provide temporary storage of at least some program code in order to reduce the number of times program code must be retrieved from the bulk storage device 116 during execution.

One or more additional input/output (I/O) devices, such as a display 118 and a pointing device (not shown), can be coupled to processing system 104. The I/O devices 118 can be coupled to the processing system 104 either directly or through one or more intervening I/O controllers 120. In illustration, an I/O controller 120 for the display can be embodied as a video card comprising a graphics processing unit (GPU), a GPU integrated into a motherboard, a GPU integrated into the processor 108, or embodied as another suitable type of graphics controller. Network adapters (not shown) also can be coupled to the processing system 104 to enable the processing system 104 to become coupled to other systems, computer systems, remote printers, and/or remote storage devices through intervening private or public networks. Modems, cable modems, and Ethernet cards are examples of different types of network adapters that can be used with processing system 104.

As pictured in FIG. 1, the memory elements 110 can store machine management code 122. The machine management code 122 can be accessed by the processor 108 at startup of the processing system 104. In illustration, the processor 108 can access the machine management code 122 from within EPROM, EEPROM or Flash memory. In this regard, the machine management code 122 can be implemented within basic input/output system (BIOS), which sometimes is referred to as system BIOS, ROM BIOS, or boot firmware. For example, the present invention can be implemented with a unified extensible firmware interface (UEFI) BIOS.

The machine management code 122 can be configured to provide one or more key distinction commands 124 to the key array 102 to selectively visually distinguish keys of the key array 102 that correspond to functions or menus that are user accessible in the processing system 104 during system startup. The keys can be visually distinguished by illuminating the keys, presenting the keys in a different color than other keys, presenting the keys with brighter illumination than other keys, or distinguishing the keys from other keys in any other suitable manner.

In illustration, if the BIOS menu is accessible during system startup in response to a user selecting the "Delete" key, the key distinction command(s) 124 can indicate to the key array 102 to visually distinguish the "Delete" key. Similarly, if a RAID menu is accessible during system startup in response to a user selecting the "F6" key, the key distinction command(s) 124 can indicate to the key array 102 to visually distinguish the "F6" key. If a particular function is accessible during system startup in response to a user simultaneously selecting the "Ctrl" and "F5" keys, the key distinction command(s) 124 can indicate to the key array 102 to visually distinguish the Ctrl" and "F5" keys. Still, a number of other keys or combination of keys can correspond to system startup commands or menus, and the invention is not limited in this regard.

Oftentimes, during startup of a processing system, an operating system is booted. The present invention further can distinguish keys that correspond to boot options of the operating system. After initial startup of the processing system has completed, and the processing system starts to boot the operating system, the present invention can illuminate any keys that may be selected to initiate operating system boot options or menus. For example, with the Microsoft® Windows® operating system, the "F8" key is usually used to access "safe mode". During the boot of Windows®, or otherwise when the "safe mode" is accessible, the "F8" key of the key array 102 can be distinguished from other keys. Other keys also may be selectable to initiate certain menus or functions in the operating system, and such keys also can be distinguished.

In one aspect, the selection of which keys to distinguished from other keys can be based on a key distinction configuration profile. For example, a basic key distinction configuration profile can be provided to identify only one or more keys that likely will be selected by most users during initial system startup, for example keys that are to be selected to access a boot menu. Such keys can be distinguished from other keys during system startup. An advanced key distinction configuration profile can be provided to identify each of the keys that correspond to an available option, such as an available menu or function, and such keys can be distinguished from other keys during system startup. The key distinction configuration profile to be implemented can be set in a suitable manner, for example within a BIOS menu. Accordingly, the BIOS settings can be changed to select which configuration profile is to be used.

Moreover, the key distinction configuration profile(s) can be configured to selectively distinguish keys corresponding to functions and/or menus accessible during boot of the operating system 128. For example, the key distinction configuration profile(s) can be configured to operate with Windows®, Unix®, Linux®, Android®, or any other operating systems. After initial startup, when the operating boot sequence begins, the keys that are illuminated can change from the keys that are applicable to initial system startup to keys that are applicable to the boot of the operating system 128. In one embodiment, as used herein, startup of a processing system includes initial system startup, which is prior to operating system boot. In another embodiment, as used herein, the startup of a processing system can include both initial system startup and booting of an operating system.

In response to a user selecting the appropriate keys via the key array 102, the key array 102 can communicate key selection commands 126 to the I/O controller 106. In response, the I/O controller 106 can communicate corresponding commands to the machine management code 122 which, being executed by the processor, can initiate presentation of the corresponding menus, for example via the display 118, or initiate corresponding functions.

Figure 2:
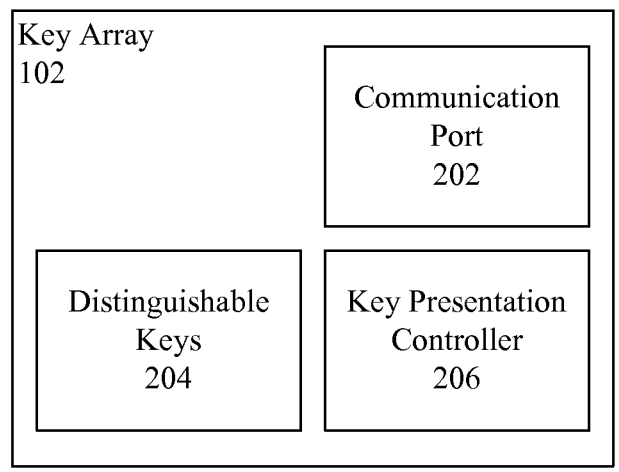
FIG. 2 is a block diagram illustrating a key array in accordance with one embodiment of the present invention.

FIG. 2 is a block diagram illustrating a key array in accordance with one embodiment of the present invention. Referring both to FIG. 1 and FIG. 2, the key array 102 can include a communication port 202 that communicatively links the key array to the I/O controller 106 depicted in FIG. 1. By way of example, the communication port 202 can be configured to receive commands, such as the key distinction commands 124 from the processing system 104 via the communication port 102. As such, the communication port 202 can be a USB port, a PS/2 port, a serial I/O (SOI) port, an AT port, ADP port, or the like. The key array 102 further can include a plurality of distinguishable keys (hereinafter "keys") 204.

One or more of the keys 204 can be configured to be distinguished from other keys 204 in the key array 102 in accordance with the key distinction commands 124. The keys 204 can be visually distinguished, haptically distinguished, or distinguished in another suitable manner. For example, the key array 102 can include one or more light emitting diodes (LEDs) behind each of its keys 204, and the keys 204 can comprise clear or semi-opaque regions through which light emitted by the LEDs pass. In another embodiment, clear or semi-opaque regions can be provided near or around the keys 204, and such regions can be selectively illuminated by corresponding LEDs. In another embodiment, the LEDs can be embedded within a surface of the keys 204 such that the LEDs are visible when they emit light. In lieu of LEDs, other light emitting devices can be presented and the invention is not limited in this regard.

In an embodiment in which certain keys 204 are haptically distinguished from other keys 204, the keys 204 can be configured to provide a haptic response, for example to vibrate, emit or absorb thermal energy, or provide any other response detectable through the touch of a human appendage, such as a finger.

In an arrangement in which the keys 204 are presented on a display, for example on a touch screen, the touch screen can be configured to distinguish portions of the touch screen on which the distinguished keys 204 are to be presented. In this regard, the keys 204 that are distinguished can be presented with one or more characteristics that distinguish such keys 204 from other keys 204 in a suitable manner. For example, the distinguished keys 204 can be presented to be illuminated brighter than other keys 204, presented with a different color than other keys 204, presented to be a different size than other keys 204, presented with a haptic response, or the like.

The key array 102 also can include a key presentation controller 206. The key presentation controller can receive the key distinction command(s) 124 via the communication port 202 and process the key distinction command(s) 124 to selectively distinguish keys 204 identified in the key distinction commands 124 from other keys 204 in the key array 102. For example, the key presentation controller 206 can include an illumination controller than controls illumination of the keys 204 or a haptic controller that controls haptic responses to be provided by the keys 204 identified in the key distinction command(s) 124. In an arrangement in which the keys are presented on a touch screen, the key presentation controller 206 can be embodied as a display controller that displays the keys 204 on the touch screen.

When any of the keys 204 are selected by a user, such key selections can be communicated to the I/O controller 106 of FIG. 1 via the communication port 202. When an operating system is booted on the processing system 104.

Figure 3:
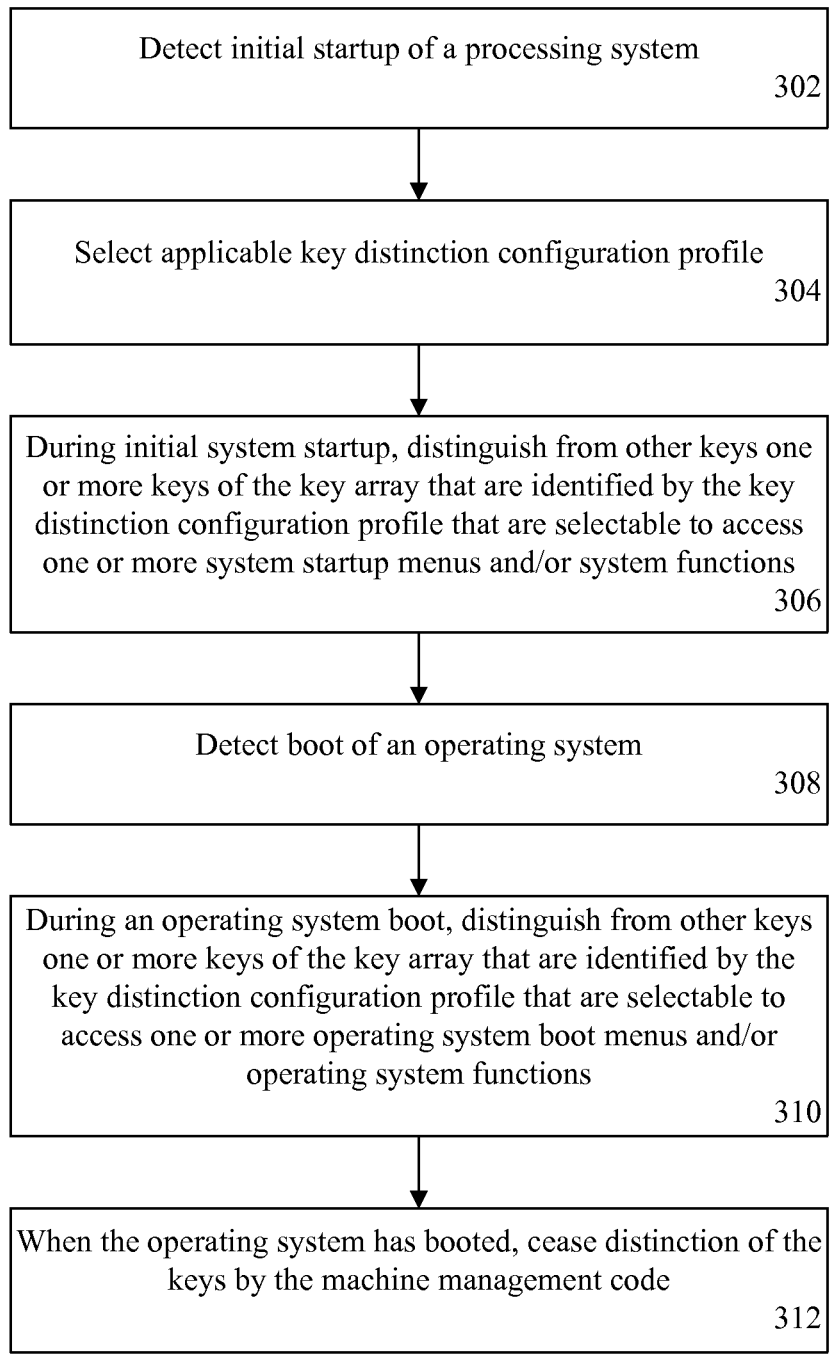
FIG. 3 is a flow chart illustrating a method of key distinction at startup of a processing system in accordance with one embodiment of the present invention.

FIG. 3 is a flow chart illustrating a method 300 of key distinction at startup of a processing system in accordance with one embodiment of the present invention. At step 302, initial startup of a processing system can be detected. At step 304, an applicable key distinction profile can be selected. At step 306, during initial system startup, one or more keys of the key array that are identified by the key distinction configuration profile that are selectable to access one or more system startup menus and/or system functions can be distinguished from other keys of a key array based on the key distinction profile. In illustration, the keys that are to be distinguished can be illuminated or controlled to provide a haptic response. The key distinction can be controlled by machine management code, as previously described. Optionally, the distinction of the keys by the machine management code can be ceased after the initial system startup of the processing system, in which case the process can end.

Optionally, at step 308, a boot of an operating system can be detected. At step 310, during operating system boot, one or more keys of the key array that are identified by the key distinction configuration profile that are selectable to access one or more operating system boot menus and/or operating functions can be distinguished from other keys based on the key distinction profile. In this regard, the keys that were distinguished during initial startup no longer need to be distinguished, unless they also are applicable to the operating system boot menus and/or functions. Again, the key distinction can be controlled by machine management code, as previously described. At step 312, when the operating system has booted, distinction of the keys by the machine management code can be ceased. Notwithstanding, further key distinctions can be implemented via the operating system.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Within a system comprising a processor and memory, a method of distinguishing at least one key of a key array, the method comprising:
   via a processor, detecting initial startup of a processing system;
   during the initial startup, prior to initiation of an operating system, illuminating at least a first key of the key array to visually distinguish the first key from other keys of the key array, wherein the first key is individually selectable to access a BIOS menu or a RAID menu prior to the initiation of the operating system;
   after the initial startup of the processing system is completed, ceasing the illuminating of the first key;
   during a boot of the operating system, illuminating at least a second key of the key array to visually distinguish the second key from other keys of the key array, wherein the second key is identified by a key distinction configuration profile and the second key is selectable to access a boot menu or function of the operating system; and
   after the boot of the operating system is completed, ceasing the illuminating of the second key.

2. The method of claim 1, further comprising:
   wherein the first key is identified by the key distinction configuration profile.

3. A computer program product comprising:
   a computer-readable storage device, wherein the computer-readable storage device is hardware, having stored thereon computer-readable program code that, when executed by a system comprising a processor and a memory, distinguishes at least one key of a key array, the computer-readable storage device comprising:
   computer-readable program code that detects initial startup of a processing system;
   computer-readable program code that, during the initial startup, prior to initiation of an operating system, illuminating at least a first key of the key array to visually distinguish the first key from other keys of the key array, wherein the first key is individually selectable to access a BIOS menu or a RAID menu prior to the initiation of the operating system;
   computer-readable program code that, after the initial startup of the processing system is completed, ceases the illuminating of the first key;
   computer-readable program code that, during a boot of the operating system, illuminates at least a second key of the key array to visually distinguish the second key from other keys of the key array, wherein the second key is identified by the key distinction configuration profile and the second key is selectable to access a boot menu or function of the operating system; and
   computer-readable program code that, after the boot of the operating system is completed, ceases the illuminating of the second key.

4. The computer program product of claim 3, wherein the first key is identified by the key distinction configuration profile.

5. A processing system comprising:
   a memory; and
   a processor configured to:
   detect an initial startup of a processing system; and
   during the initial startup, prior to initiation of an operating system, illuminate at least a first key of a key array to visually distinguish the first key from other keys of the key array, wherein the first key is individually selectable to access a BIOS menu or a RAID menu prior to the initiation of the operating system;
   after the initial startup of the processing system is completed, cease the illuminating of the first key;
   during a boot of the operating system, illuminate at least a second key of the key array to visually distinguish the second key from other keys of the key array, wherein the second key is identified by a key distinction configuration profile and the second key is selectable to access a boot menu or function of the operating system; and
   after the boot of the operating system is completed, cease the illuminating of the second key.

6. The system of claim 5, wherein the first key is identified by the key distinction configuration profile.

7. A key array comprising:
   a plurality of keys;
   a communication port; and
   a key presentation controller configured to;
   during the initial startup of a processing system, prior to initiation of an operating system, illuminate at least a first of the plurality of keys to visually distinguish the first key from other ones of the plurality of keys, wherein the first key is individually selectable to access a BIOS menu or a RAID menu prior to the initiation of the operating system;

after the initial startup of the processing system is completed, cease the illuminating the of first key;

during a boot of the operating system, illuminate at least a second of the plurality of keys to visually distinguish the second key from other ones of the plurality of keys, wherein the second key is identified by a key distinction configuration profile and the second key is selectable to access a boot menu or function of the operating system; and after the boot of the operating system is completed, cease the illuminating of the second key.

8. The key array of claim 7, wherein the first key is identified by the key distinction configuration profile.

\* \* \* \* \*